3,407,112
POLYETHYLENE TEREPHTHALATE FILM AND
PROCESS OF PREPARATION THEREOF
Michael Karickhoff, Circleville, Ohio, and Conrad Erve
Miller, Florence, S.C., assignors to E. I. du Pont de
Nemours and Company, Wilmington, Del., a corporation of Delaware
No Drawing. Filed Apr. 9, 1963, Ser. No. 271,588
6 Claims. (Cl. 161—165)

This invention relates to modified, linear polyester films and processes for their preparation and more particularly to structurally modified polyethylene terephthalate films and processes for their preparation.

Polyethylene terephthalate is capable of being formed into translucent or transparent films having excellent physical properties. Certain of these properties, such as tensile strength, flex life, impact strength, etc., can be further enhanced by a process of orientation. For example, oriented, heat-set polyethylene terephthalate film, e.g., film which has been stretched at least 3× in both directions and heat-set at a temperature of about 200° C. under tension, is a highly versatile material because of its relatively balanced physical properties, excellent electrical properties and outstanding resistance to chemical degradation. The film can be employed to great advantage in a wide variety of uses, e.g., electrical, packaging and wrapping, protective coverings, lamination to other materials such as metal foil, etc.

In the manufacture of oriented, polymeric linear terephthalic ester films such as polyethylene terephthalate, the film is prepared by extruding the polymer in a molten state from a slot-shaped orifice onto a casting surface such as a cylindrical casting drum, a wheel or an endless belt. The molten film cast upon the cool casting surface is quenched to form a self-supporting film which is continuously stripped from the moving casting surface.

When the extruded polymer is rapidly cooled, the film formed is in a substantially amorphous state. In this condition the film is transparent and is readily orientable by means of a stretching operation. Such stretched films exhibit superior physical properties. If, however, the film is allowed to cool slowly on the casting surface, the polymer starts to crystallize and becomes opaque, and stretching, because of the increased forces necessary, now becomes more difficult. The stretching of heavy gauge films, i.e., films having an as-cast thickness of greater than 30 mils, prepared by the process described above, is exceedingly difficult, and generally impractical because of the inability of the film, upon casting, to be cooled rapidly enough to insure against substantial crystallization prior to stretching. This results in the consequent increase in forces required to stretch the films.

The presence of ether linkages, while reducing the rate of crystallization in a substantially amorphous film, has a number of undesirable effects on the properties of the polymer. It has been shown that measurably significant amounts of these linkages have a detrimental effect upon the melt stability of the polymer, and the high temperature durability and hydrolytic stability of the oriented polyethylene terephthalate film.

It is, therefore, an object of this invention to provide modified, linear polyester films which are readily quenchable in thicknesses greater than 30 mils and processes for their preparation.

It is a further object of this invention to provide structurally modified polyethylene terephthalate films and processes for their preparation which can be readily quenched to the substantially amorphous state and which retain on subsequent orientation, the physical, chemical and electrical properties of unmodified polyethylene terephthalate films. These and other objects will appear hereinafter.

The process of the present invention, briefly stated, comprises adding to glycol ester prior to substantial polymerization taking place, i.e., intrinsic viscosity of the glycol ester does not exceed 0.2, a branched chain alkylene glycol of the formula HO—CH$_2$—S(R)$_2$—CH$_2$OH, where R is an alkyl group having 1 to 4 carbon atoms, in an amount such that the mole ratio of the methylene ester units to the branched chain alkylene ester units in the final polyester polymer ranges between 90/10 to 98/2, and thereafter extruding the polyester onto a moving casting surface to form a film, preferably a film having an as-cast thickness of greater than 30 mils. Such branched chain alkylene glycols include neopentyl glycol, 2,2-diethyl-1,3-propanediol and 2,2-dipropyl-1,3-propanediol.

In the preferred embodiment of this invention, 2,2-dimethyl-1,3-propanediol, hereinafter referred to as neopentyl glycol, is added prior to polymerization, to either the reaction between dimethyl terephthalate and ethylene glycol carried out under ester-interchange conditions whereby bis-2-hydroxyethyl terephthalate is formed or, alternatively, to previously synthesized bis-2-hydroxyethyl terephthalate (DHET) as a chemical intermediate in flake form. The amount of neopentyl glycol added initially to the DHET must be sufficient to produce in the final polymer a mole ratio of ethylene terephthalate units to neopentyl terephthalate units ranging between 90/10 to 98/2, with a mole ratio of 95/5 to 97.5/2.5 being preferred.

It is also within the scope of the present invention to prepare polyesters by reacting in place of ethylene glycol, other polymethylene glycols selected from the series HO(CH$_2$)$_n$OH where $n$ is an integer from 2 to 10, inclusive, and in place of a dimethyl dicarboxylic acid ester, any of the acid esters of lower unsaturated aliphatic monohydric alcohols, i.e., containing up to and including 7 carbon atoms.

Any glycol of the formula

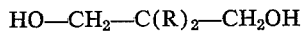

$$HO—CH_2—C(R)_2—CH_2OH$$

where R is an alkyl radical having from 1 to 4 carbon atoms can be employed for the purpose of this invention. The preferred branched chain glycol is, however, neopentyl glycol (2,2-dimethyl-1,3-propanediol) and the invention will be described hereinafter with specific reference to neopentyl glycol.

As mentioned hereinbefore, the mole ratio of the ethylene terephthalate units to the neopentyl terephthalate units in the final polymer must range between 90/10 to 98/2. The preferred range is 95/5–97.5/2.5. If more than 10 mole percent neopentyl terephthalate units are present in the final polymer, the desired characteristics of polyethylene terephthalate start to become significantly altered, if less than 2.5 mole percent neopentyl terephthalate units are present, the desired reduction rate of crystallization, and improved melt stability will not be obtained.

The branched chain alkylene glycol must be added during the ester interchange reaction or prior to the polymerization reaction in the case of DHET to insure that the additive is incorporated into the polymer chain. It is at these points that the intrinsic viscosity of glycol ester is under 0.2.

The relationship between the quantity (mole percent) of neopentyl glycol added initially to the DHET prior to polymerization and the mole percent neopentyl terephthalate units in the finished polymer is a surprisingly unique one in that a given mole percent neopentyl glycol added initially to the reaction mixture will not give an equivalent mole percent neopentyl terephthalate in the product. For example, if ethylene glycol and neopentyl glycol are initially reacted with dimethyl terephthalate in the mole ratio of 97/3, the approximate mole ratio of ethylene terephthalate and neopentyl terephthalate units in the finished copolymer will be 95/5.

Table I, below, illustrates this phenomenon. The initial mole ratio of glycols required to produce the desired final ethylene terephthalate to neopentyl terephthalate unit ratio will range, therefore, from approximately 94/6 to 99/1 with the preferred range being from 97/3 to 98.5/1.5.

TABLE I

[Relationship of neopentyl glycol initially added to the polymerization reaction to the neopentyl terephthalate present in the final polymer]

| Neopentyl Glycol Added to Initial Reaction (Mol percent based on total glycol) | Neopentyl Terephthalate Present in Final Polymer (Mol percent based on total glycol) |
|---|---|
| 0.5 | 0.8 |
| 1.0 | 1.6 |
| 1.5 | 2.4 |
| 2.0 | 3.2 |
| 2.5 | 4.0 |
| 3.0 | 4.8 |
| 3.5 | 5.6 |
| 4.0 | 6.4 |
| 4.5 | 7.2 |
| 5.0 | 8.0 |
| 5.5 | 8.8 |
| 6.0 | 9.6 |

The copolyester product should have an intrinsic viscosity of at least 0.50. As used herein, intrinsic viscosity, denoted by the symbol $(n)_0$ is a measure of degree of polymerization of a polyester and may be defined as: limit of $$\frac{1n\ (n)_r}{c}$$

as $c$ approaches 0 wherein $(n)_r$ is the viscosity of a dilute phenol-tetrachloroethane (60/40) solution of the polyester divided by the viscosity of the phenol-tetrachloroethane mixture per se measured in the same units at the same temperature and $c$ is the concentration in grams of polyester/100 cc. of solution.

The following specific examples serve to further illustrate the principles and practice of the present invention.

EXAMPLES 1–9

Orientable polyethylene terephthalate films having an as-case thickness of greater than 30 mils (A) are produced by the general procedure described in U.S. Patent 2,465,319 to Whinfield and Dixon, modified by the addition of neopentyl glycol in accordance with this invention, and with further modifications as to the use of specific ester-interchange and polymerization catalysts, the description of which can be found in the art or (B) by the direct polymerization of bis-hydroxymethyl terephthalate in the form of flake, the preparation of which is well known to the art. The DHET is modified by the addition of neopentyl glycol to the reactants prior to the polymerization step in accordance with this invention. Polymerization catalysts known and described in the art are also added directly to the monomeric mixture. A more detailed description of these two methods of polymer preparation follows.

Procedure A

Ethylene glycol and dimethyl terephthalate (DMT) in the ratio of 1 mole of DMT to 2 moles of ethylene glycol are introduced into a reaction vessel fitted with stirring means. Also introduced into the vessel are 0.002% lithium hydride, 0.012% zinc acetate dihydrate, and 0.03% antimony trioxide (based on the weight percent of DMT) along with varying quantities of neopentyl glycol (0, 1.2 and 2.4 mole percent based on the total of glycol used). An ester-interchange reaction is conducted at atmospheric pressure and within a temperature range of 140 to 220° C. and methanol is continuously withdrawn from the reactor.

At the end of the ester-interchange step, polymerization of bis-2-hydroxyethyl terephthalate is conducted within the temperature range of 230 to 290° C. under reduced pressure within the range from 0.05 to 2.5 mm. of mercury. During polymerization, glycol is continuously withdrawn from the reactor. The polymerization reaction is run until an intrinsic viscosity within the range of 0.50 to 0.65 is obtained.

The polymer is introduced into conventional extrusion apparatus from which molten polymer is coninuously extruded into film in substantially amorphous form. The film is then cooled at room temperature on the quench roll.

After extrusion and quenching, the films are then continuously stretched longitudinally and transversely to substantially the same extent (3× its initial dimension) in each direction to form a substantially balanced film, i.e., physical properties being substantially the same in both directions. Finally, the films are heat-set at 200° C. while held under tension.

Procedure B

Bis-2-hydroxyethyl terephthalate (DHET), the preparation of which is well known in the art, in the form of flake, is melted in a reaction vessel at 140° C. Tetraisopropyl titanate in the concentration of four to five parts per million titanium, based on the weight of reactants, is employed as the catalyst and is added directly to the DHET reaction vessel. Also added directly to the reaction ingredients is neopentyl glycol in varying amounts (0, 1.2 and 2.4 mole percent based on the total weight of glycol used).

The bis-2-hydroxyethyl terephthalate polymerization is conducted within the temperature range of 230 to 290° C. under reduced pressure within the range of 0.05 to 2.5 mm. of mercury. During polymerization, glycol is continuously withdrawn from the reactor. The polymerization reaction is run until an intrinsic viscosity within the range of 0.50 to 0.65 is obtained.

The polymer is introduced into conventional extrusion apparatus from which molten polymer is continuously extruded into film in substantially amorphous form. The film is then cooled at room temperature on the quench roll.

After extrusion and quenching, the films are then continuously stretched longitudinally and transversely to substantially the same extent (3× its initial dimension) in each direction to form a substantially balanced film, i.e., physical properties being substantially the same in both directions. Finally, the films are heat-set at 200° C. while held under tension.

The film samples prepared by both of the above procedures are subjected to a series of physical tests and the unmodified polyethylene terephthalate samples (containing 0% neopentyl glycol) compared with those modified by the addition of varying amounts of neopentyl glycol. The results of these tests are summarized in Table II.

the high physical and chemical property standards of the unmodified polyethylene terephthalate.

TABLE II.—PHYSICAL PROPERTY DATA FOR ORIENTED HEAT-SET POLYETHYLENE TEREPHTHALATE FILMS MODIFIED BY ADDITION OF NEOPENTYL GLYCOL

| Physical Properties | Example Number | | | | | | | | |
|---|---|---|---|---|---|---|---|---|---|
| | 1 | 2 | 3 | 4 | 5 | 6 | 7 | 8 | 9 |
| | Polymerization Procedure Employed | | | | | | | | |
| | B | B | B | A | A | B | A | B | B |
| | Mol Percent Neopentyl Glycol Added | | | | | | | | |
| | 1.2 | 0 | 2.4 | 0 | 2.4 | 2.4 | 2.4 | 1.2 | 2.4 |
| A. Modulus (p.s.i.=10⁻⁵): | | | | | | | | | |
| LD | 6.20 | 6.34 | 6.19 | 5.70 | 5.97 | 5.89 | 6.19 | 5.50 | 5.89 |
| TD | 7.62 | 6.47 | 6.08 | 6.19 | 6.05 | 6.02 | 5.83 | 6.72 | 6.02 |
| B. Tensile strength (p.s.i.×10⁻⁵): | | | | | | | | | |
| LD | 0.268 | 0.336 | 0.311 | 0.287 | 0.269 | 0.285 | 0.280 | 0.289 | 0.285 |
| TD | 0.337 | 0.265 | 0.276 | 0.288 | 0.273 | 0.254 | 0.293 | 0.297 | 0.254 |
| C. Elongation (percent): | | | | | | | | | |
| LD | 108.7 | 121.0 | 108.7 | 158.2 | 145.6 | 170.1 | 117.3 | 157.1 | 107.1 |
| TD | 72.2 | 114.7 | 132.4 | 147.3 | 168.7 | 123.7 | 174.1 | 112.9 | 123.7 |
| D. Tear (Gms.): | | | | | | | | | |
| LD | | 133.6 | 158.4 | 128.0 | 142.4 | 150.4 | 129.6 | 124.0 | 150.4 |
| TD | | 202.4 | 205.6 | 195.2 | 270.8 | 158.4 | 151.2 | 203.2 | 158.4 |
| E. Dimensional Stability at— | | | | | | | | | |
| 150° C.: | | | | | | | | | |
| LD | | 2.28 | 2.32 | 1.76 | 1.72 | 1.62 | 1.30 | 1.04 | 1.62 |
| TD | | 2.12 | 2.20 | 1.56 | 1.40 | 1.36 | 0.96 | 1.40 | 1.36 |
| 200° C.: | | | | | | | | | |
| LD | 5.1 | 7.28 | 6.96 | 6.28 | 5.16 | 7.00 | 6.80 | 5.60 | 7.00 |
| TD | 6.2 | 6.92 | 6.16 | 5.20 | 4.20 | 7.04 | 6.70 | 7.80 | 7.04 |
| F. Impact Strength, kg./cm | | 40.24 | 36.03 | 37.49 | 37.71 | 35.05 | 35.87 | 35.30 | 35.05 |
| G. Density, gm./cc | 1.3919 | 1.3951 | 1.3900 | 1.3947 | 1.3920 | 1.3931 | 1.3877 | 1.3931 | 1.3931 |
| H. Intrinsic Viscosity | | 0.53 | 0.54 | 0.53 | 0.57 | 0.54 | 0.55 | 0.56 | 0.54 |
| I. High Temperature durability,° C | 236 | 238 | 220 | 220 | 230 | | | | |

As can be seen from the table, polyester films containing neopentyl glycol exhibit physical properties substantially identical with the unmodified polyethylene terephthalate films.

EXAMPLE 10

Samples of modified polyethylene terephthalate are prepared by Procedure A as described in Example 1. The catalyst system employed comprises 0.022% zinc acetate dihydrate, 0.035% antimony trioxide, and 0.002% lithium hydride (based on the weight of dimethyl terephthalate). 3 mole percent of neopentyl glycol (based on the total glycol employed) is added to the original reaction in the form of a 50% solution of ethylene glycol. After polymerizing, the polymer is extruded in the form of a film 50 mils thick and quenched in a manner such as described hereinbefore.

These samples are then subjected to a series of tests to determine the chemical and physical properties of the copolyester films. Table III, below, compares the chemical and physical properties of the representative sample of the modified polyethylene terephthalate film prepared as above with conventional polyethylene terephthalate film.

From Table III can be seen that the modified polyethylene terephthalate films of the present invention retain all TABLE III.—PHYSICAL AND CHEMICAL PROPERTIES OF ORIENTED HEAT-SET POLYETHYLENE TEREPHTHALATE FILM MODIFIED BY ADDITION OF NEOPENTYL GLYCOL

| Physical Properties | Polyethylene Terephthalate | |
|---|---|---|
| | Modified Example 10 | Unmodified Standard Specifications |
| | Polymerization Procedure | |
| | A | A |
| | Mol Percent Neopentyl Glycol | |
| | 3 | 0 |
| A. Modulus (p.s.i.×10⁻⁵): | | |
| LD | 5.90 | 4.0–6.5 |
| TD | 5.52 | 4.0–6.5 |
| B. Elongation, Percent: | | |
| LD | 153.6 | 90.0–170.0 |
| TD | 145.0 | 90.0–170.0 |
| C. Tensile Strength (p.s.i.×10⁻³): | | |
| LD | 23.9 | 20.0–30.0 |
| TD | 22.5 | 20.0–30.0 |
| D. Dim Stability at 150° C.: | | |
| LD | 2.26 | [1] 7.0 |
| TD | 0.60 | [1] 7.0 |
| E. Density | 1.3970 | |
| F. High Temperature Durability,° C | 220 | 220 |
| Chemical Properties: | | |
| A. Intrinsic Viscosity | 0.54 | 0.54–0.58 |
| B. Carboxyls (eq./10⁶ gm.) | 25.5 | [1] 30 |
| C. Color (TFA) Absorbance at 400 mμ | 0.10 | [1] 0.18 |
| D. Extractables, Percent | 1.44 | [1] 1.65 |

[1] Maximum.

EXAMPLES 11-15

Samples of modified polyethylene terephthalate films are prepared by Procedure A as described in Example 1. The mole percent of neopentyl glycol added to the initial reaction mixture is varied between 0.5 to 3.0 percent. After polymerization, the polymer is extruded into the form of a film 10 mils in thickness and quenched. The resulting substantially amorphous films are then tested for rates of crystallization. The crystallization half-time of the films at 140° C. are determined by the density method.

In this method, 10 mil samples of as-cast film are immersed in SF-96(10) silicone oil for various time intervals at 120±1° C. The test samples are then rinsed in benzene to remove the silicone oil. After drying, the densities are determined in a carbon tetrachloride/n-heptane gradient tube.

Table IV, below, summarizes the results of these determinations, listing the example number, percent neopentyl glycol added, and crystallization half-time ($t_{1/2}$) in minutes.

TABLE IV.—RATES OF CRYSTALLIZATION OF POLYETHYLENE TEREPHTHALATE FILM B MODIFIED BY ADDITION OF NEOPENTYL GLYCOL

| Example Number | Mole Percent Neopentyl Glycol | Crystallization Half-time ($t_{1/2}$), min. | Temperature, ° C. |
| --- | --- | --- | --- |
| 11 | 0.0 | 0.2 | 140 |
| 12 | 0.5 | 0.4 | 140 |
| 13 | 1.0 | 0.45 | 140 |
| 14 | 2.0 | 0.7 | 140 |
| 15 | 3.0 | 0.65 | 140 |

The data in Table IV shows that presence of greater than 1% neopentyl glycol added to the polyethylene terephthalate polymerization reaction produces a film whose rate of crystallization is substantially retarded.

Since it has been shown in the previous examples that polyethylene terephthalate polymer modified with small quantities of neopentyl glycol can be biaxially oriented and crystallized to produce films of oriented polyethylene terephthalate having the physical properties and dimensional stability equivalent to unmodified films, it will be evident to one skilled in the art that this chemical modification only reduces the rate of crystallization and does not preclude crystallization. This reduction of rate of crystallization, as will be seen from the examples to follow, enables thicker gauge polyethylene terephthalate films (greater than 30 mils) to be successfully quenched and oriented.

EXAMPLE 16

This example illustrates the improved melt stability (resistance to thermal degradation) exhibited by the modified polyethylene terephthalate films prepared by the process of the present invention.

Samples of unmodified and modified (3 mole percent neopentyl glycol) polyethylene terephthalate polymer are prepared by Procedure A as described in Example 1. Initial intrinsic viscosities of the two types of polymer are measured and tests for thermal degradation (as measured by a decrease in intrinsic viscosity) are carried out. Samples of each polymer are placed in sealed evacuated systems ($5\times10^{-5}$ mm. of Hg) at 283° C. At various time intervals ranging between 10 to 90 minutes, intrinsic viscosity measurements are made on the respective samples.

These measurements show that the intrinsic viscosity of the modified polyethylene terephthalate polymer remains substantially constant over the 90 minutes test period. The intrinsic viscosity of unmodified polyethylene terephthalate polymer, however, drastically decreases over the period, indicating thermal degradation is taking place. The data shows that the melt stability of the polymer modified by neopentyl glycol prepared by the process of the present invention is substantially improved over that of unmodified polyethylene terephthalate.

EXAMPLE 17

This example illustrates the value of the addition of neopentyl glycol to the polyethylene terephthalate polymerization process in retarding the rate of crystallization of polyethylene terephthalate.

Molten polyethylene terephthalate prepared from DHET utilizing tetraisopropyl titanate as a catalyst (5 parts per million of titanium based on the total weight of reactants) as described previously in Procedure B, is cast from a pressurized hopper onto a water cooled quench drum. The resultant cast base sheet is 54 mils thick and about 11 inches wide. The hazy appearance of the cast sheet indicates excessive crystallinity in the as-cast film. Extreme difficulty is experienced in attempting to biaxially stretch this film. When the catalyst formulation is changed to include 2.4 mole percent peopentyl glycol, not only is a significant improvement noted in runability, but also no haziness is observed in the cast sheet.

EXAMPLE 18

Polyethylene terephthalate modified with 5 mole percent 2,2-dipropyl-1,3-propanediol is prepared by Procedure A as described in Example 1. After polymerization, the polymer is extruded into the form of a film 50 mils in thickness. There is no haziness observed in the cast sheet and there is no hindrance in runability.

The copolymerization of small quantities of neopentyl glycol with ethylene glycol in the preparation of polyethylene terepthalate films has resulted in a new, unique copolymer composition. The copolymer has demonstrated many advantages. It has a reduced rate of crystallization, that is, copolymerization with neopentyl glycol can be used to retard crystallization during processing of polyethylene terephthalate film. Modified polymers can be biaxially oriented and crystallized to produce films of oriented polyethylene terephthalate having dimensional stability equivalent to unmodified polyethylene terephthalate. Thus, this chemical modification only reduces the rate of crystallization and does not preclude crystallization. The copolymer and its resulting retardation of crystallization also makes it possible to cast a film thicker than 30 mils from a DHET prepared polymer.

The copolymer has improved melt stability. Neopentyl glycol containing polymers experience less viscosity loss during melt degradation than unmodified polyethylene terephthalate polymers. The copolymer film also retains the superior physical and chemical properties of the unmodified film. Chemical and physical properties determined on neopentyl glycol containing polyethylene terephthalate films show neopentyl glycol will not adversely affect the properties of oriented polyethylene terephthalate film. Also, neopentyl glycol has no detrimental effect on the polymerization reaction leading to the formation of polyethylene terephthalate.

What is claimed is:

1. In a process for the production of polymeric ester film wherein film-forming polymeric ester polymer is derived by reacting a polymethylene glycol of the formula $HO(CH_2)_nOH$ wherein $n$ is a positive integer from 2–10 with an acidic component selected from the group consisting of terephthalic acid and alkyl ester thereof, said alkyl groups having 1–7 carbon atoms, and polymerizing the resulting glycol ester to form a polyester, the improvement comprising: adding to said glycol ester at a point before the intrinsic viscosity exceeds 0.2, a branched chain alkylene glycol of the formula

HO—CH₂(R)₂—CH₂OH wherein R is an alkyl group of from 1–4 carbon atoms in an amount such that the mole ratio of the methylene ester units to the branched chain alkylene ester units in the final polymer is within the range of about 90:10 to 98:2, and thereafter extruding said polyester onto a moving casting surface to form a film having an as-cast thickness greater than 30 mils.

2. The process of claim 1 wherein the glycol ester is derived from ethylene glycol and dimethyl terephthalate.

3. In a process for the production of polyethylene terephthalate film wherein film-forming polyethylene terephthalate is derived by reacting ethylene glycol with dimethyl terephthalate under ester-interchange conditions, and polymerizing the resulting glycol terephthalate to form a molten film-forming polyester, the improvement comprising: adding to said glycol terephthalate at a point before the intrinsic viscosity exceeds 0.2, neopentyl glycol in an amount such that the mole ratio of the ethylene terephthalate units to the neopentyl terephthalate units in the final polymer is within the range of 95:5 to 97:2.5 and thereafter extruding said polyester onto a moving casting surface to form a film having an as-cast thickness greater than 30 mils.

4. In a process for the production of polyethylene terephthalate film wherein bis-2-hydroxyethyl terephthalate is heated at a temperature within the range of 230 to 290° C. under a pressure within the range of from 0.05 to 2.5 millimeters of mercury in the presence of a catalyst effective to promote polymerization, for a time sufficient to produce a film-forming polyethylene terephthalate polymer, the improvement comprising: adding to the bis-2-hydroxyethyl terephthalate at a point before the intrinsic viscosity exceeds 0.2, neopentyl glycol in an amount such that the role ratio of the ethylene terephthalate units to the neopentyl terephthalate units in the final polymer is wihin the range of about 95:5 to 97.5:2.5 and thereafter extruding said polymer onto a moving casting surface to form a film having an as-cast thickness greater than 30 mils.

5. An article of manufacture comprising a self-supporting film structure having a thickness greater than 30 mils of a polymeric ester formed from reactants comprising terephthalic acid or an ester derivative thereof, a polyethylene glycol of the formula HO(CH₂)ₙOH wherein $n$ is a positive integer from 2 to 10 and a branched-chain alkylene glycol of the formula

HO—CH₂—C(R)₂—CH₂OH wherein R is an alkyl group of from 1 to 4 carbon atoms, the mole ratio of the methylene ester units to the branched-chain alkylene ester units being within the range of 90:10 to 98:2 and said polymeric ester having an intrinsic viscosity of at least 0.50.

6. The article of claim 5 wherein the polyethylene glycol is ethylene glycol, the branched-chain alkylene glycol is neopentyl glycol.

References Cited

UNITED STATES PATENTS

| | | | |
|---|---|---|---|
| 2,820,023 | 1/1958 | Cavanaugh et al. | 260—75 |
| 3,057,824 | 10/1962 | La Bras et al. | 260—75 |
| 3,054,703 | 9/1962 | Brasure | 260—75 |

OTHER REFERENCES

Borjksten et al., Polyesters and Their Application.

WILLIAM H. SHORT, *Primary Examiner.*

R. T. LYON, *Assistant Examiner.*